(12) United States Patent
Short

(10) Patent No.: US 10,431,033 B1
(45) Date of Patent: Oct. 1, 2019

(54) SYSTEMS AND METHODS TO PROVIDE PHYSICAL ITEMS TO USERS PARTICIPATING IN A REAL-WORLD INTERACTIVE ENVIRONMENT

(71) Applicant: Disney Enterprises, Inc., Burbank, CA (US)

(72) Inventor: Shelley Short, Burbank, CA (US)

(73) Assignee: Disney Enterprises, Inc., Bubank, CA (US)

( * ) Notice: Subject to any disclaimer, the term of this patent is extended or adjusted under 35 U.S.C. 154(b) by 12 days.

(21) Appl. No.: 15/982,219

(22) Filed: May 17, 2018

(51) Int. Cl.
*G07F 7/02* (2006.01)
*H04L 29/08* (2006.01)
*A63H 33/42* (2006.01)

(52) U.S. Cl.
CPC .............. *G07F 7/02* (2013.01); *A63H 33/42* (2013.01); *H04L 67/12* (2013.01); *H04L 67/306* (2013.01)

(58) Field of Classification Search
USPC ........................................................ 235/383
See application file for complete search history.

(56) References Cited

U.S. PATENT DOCUMENTS

| | | | |
|---|---|---|---|
| 7,593,897 B1 | 9/2009 | Kolls | |
| 8,654,018 B2 | 2/2014 | Warther | |
| 8,972,048 B2 | 3/2015 | Canora | |
| 9,349,238 B2 | 5/2016 | Tkachenko | |
| 9,697,685 B1 | 7/2017 | Al-Saleh | |
| 9,744,462 B2 | 8/2017 | Dutilly | |
| 2008/0126261 A1* | 5/2008 | Lovett | G06Q 20/04 705/72 |
| 2012/0136478 A1 | 5/2012 | Anand | |
| 2013/0059648 A1 | 3/2013 | Rowe | |
| 2014/0156369 A1 | 6/2014 | Circe | |
| 2015/0046202 A1 | 2/2015 | Hunt | |
| 2016/0090288 A1 | 3/2016 | Givens, Jr. | |
| 2016/0092851 A1 | 3/2016 | De Berg Hewett | |
| 2016/0148026 A1 | 5/2016 | Grimaux | |
| 2016/0155285 A9 | 6/2016 | Peters | |
| 2017/0024713 A1 | 1/2017 | May | |
| 2017/0132608 A1 | 5/2017 | Jardany | |

* cited by examiner

*Primary Examiner* — Rafferty D Kelly
(74) *Attorney, Agent, or Firm* — Esplin & Associates, PC

(57) ABSTRACT

This disclosure relates to systems and methods to provide physical items to users participating in a real-world interactive environment. The users may participate in the interactive environment by having experiences within the interactive environment. The systems and methods described herein include techniques in which the users may be provided with physical items through special purpose physical item dispensers. The physical items may be specifically selected and dispensed to the users based on the experiences that have occurred during their past participation.

20 Claims, 3 Drawing Sheets

SYSTEMS AND METHODS TO PROVIDE PHYSICAL ITEMS TO USERS PARTICIPATING IN A REAL-WORLD INTERACTIVE ENVIRONMENT

FIELD

This disclosure relates to providing physical items to users participating in a real-world interactive environment.

BACKGROUND

Many venues provide guest with many opportunities for interactive experiences. These experiences may involve one or more of attractions, games, live shows, movies, costumed characters, and/or other experiences.

SUMMARY

This disclosure relates to systems and methods to provide physical items to users based on their experiences such as experiences gained by participating in an interactive environment. The user experiences may take place in a real-world location such as one or more of a theme park, an amusement park, a cruise ship, a shopping mall, sporting venue, concert venue, and/or other locations. The users may participate in the interactive environment by having active and/or passive experiences within the interactive environment. The experiences may include one or more of visiting an attraction (e.g., a ride and/or other attraction), interacting with attractions, (e.g., riding the ride and/or other interactions), interacting with other users, attending live shows, playing games, witnessing an event, and/or other forms of participation. The systems and methods described herein contemplate techniques in which the users may be provided with physical items through special purpose physical item dispensers. The physical items may be specifically selected and dispensed to the users based on the experiences that have occurred during their past participation. By way of non-limiting illustration, an individual physical item may be relevant to one or more experiences. The physical item may provide an enhancement to the one or more experiences (e.g., provide further entertainment value to the user). The physical item may drive future experiences that may be related to the one or more prior experiences (e.g., facilitate completion of a next step in a game being played in the interactive environment). Other types of physical items relevant to experiences in the interactive environment may be provided.

A system configured to provide physical items to users participating in a real-world interactive environment may include one or more of one or more physical item dispensers, one or more physical processors, and/or other components. A given physical item dispenser may be a special purpose device configured to dispense the physical items. A physical item dispenser may have a physical appearance that is designed to be consistent with a particular theme. The theme may be related to one or more of a location, a brand, a franchise, an experience and/or set of experiences, sports team, event venue, holiday, historical event, character and/or other themes. By way of non-limiting illustration, a physical item dispensers may be positioned at or near an attraction.

In some implementations, the one or more processors may be configured by machine-readable instructions. The machine-readable instructions may include one or more computer program components. The computer program components may include one or more of an item management component, a user component, a detection component, a dispensing component, and/or other components.

The item management component may be configured to effectuate storage of item inventory information and/or other information. The item inventory information may include descriptions of physical items available for distribution to users from a physical item dispenser and/or other information.

The user component may be configured to store and/or access user information associated with user. The user information may include one or more of information identifying physical tokens associated with the individual users, user experience information, and/or other information. The user experience information for an individual user may describe experiences of the user within the interactive environment. The experiences may have occurred during past user participation in the interactive environment. User experiences may vary significantly in the degree of interaction for that experience from a relatively passive experience such as watching an event and/or walking along a path through a park, to very interactive where a user speaks with a character or participates in the performance of a show.

The detection component may be configured to detect presence of physical tokens at or near an individual reader based on signals received from the reader. The reader may be communicatively coupled with the physical item dispenser. Individual physical tokens may be standalone physical objects. The physical tokens may include a first token and/or other tokens. The first token may be detectable based on a first signal conveying information associated with the first token being received from the reader.

The detection component may be configured to identify individual users associated with the detected individual tokens. By way of non-limiting illustration, a first user associated with the first token may be identified.

The dispensing component may be configured to obtain user experience information and/or other information for the identified individual users. By way of non-limiting illustration, first user experience information may be obtained for the first user. The first user experience information may describe a first set of experiences of the first user.

The dispensing component may be configured to identify, based on the user experience information, the item inventory information, and/or other information, one or more physical items to dispense to the individual users physically present at the physical item dispenser. By way of non-limiting illustration, a first physical item may be identified from the item inventory information based on the first set of experiences.

The dispensing component may be configured to control the physical item dispenser to dispense the identified one or more physical items. By way of non-limiting illustration, the physical item dispenser may be controlled to dispense the first physical item for the first user.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

DETAILED DESCRIPTION

Figure 1:
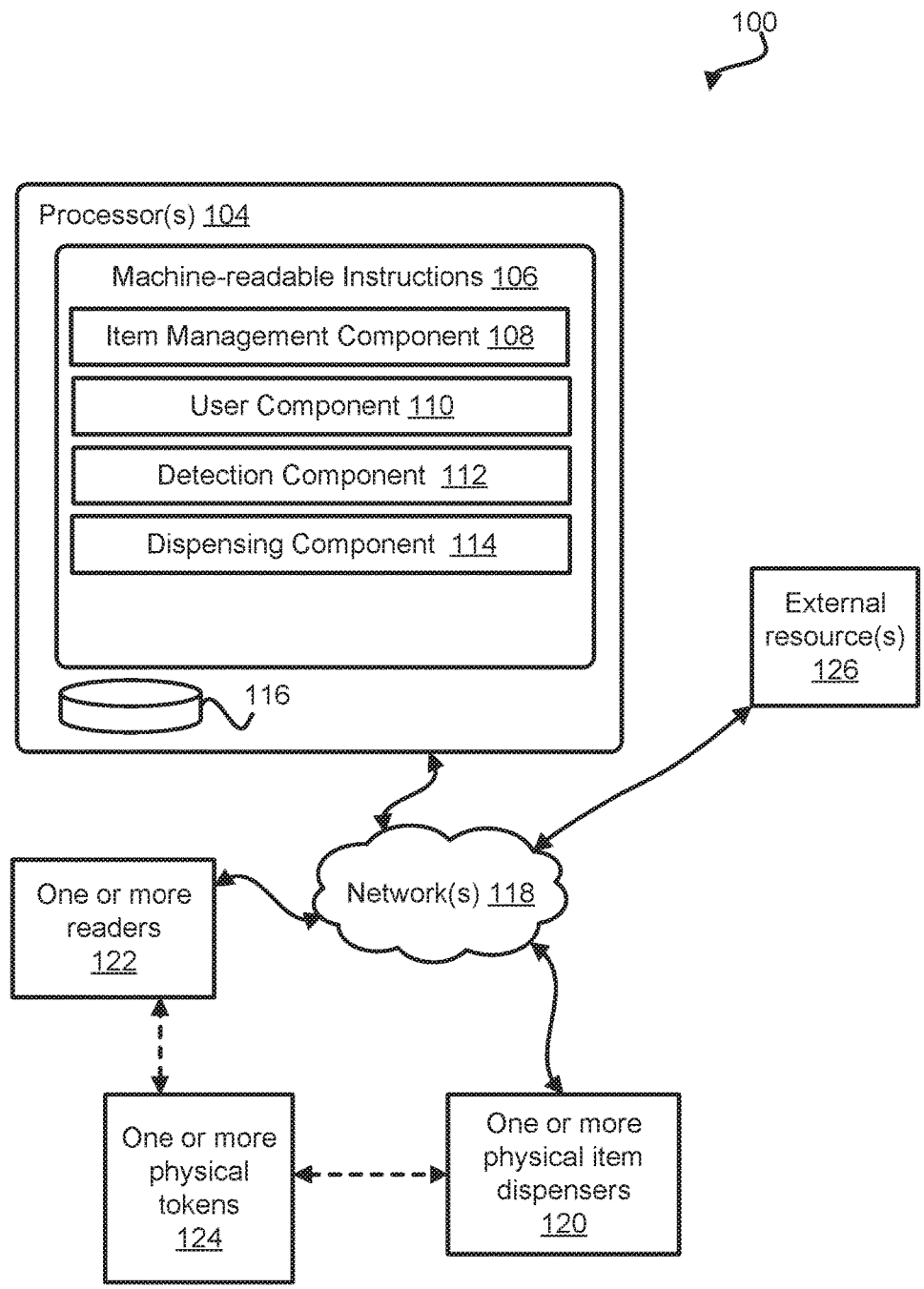
FIG. 1 illustrates a system configured to provide physical items to users participating in a real-world interactive environment, in accordance with one or more implementations.

FIG. 1 illustrates a system 100 configured to provide physical items to users based on experiences gained by participating in an interactive environment, in accordance with one or more implementations. The user experiences may take place in a real-world location. The real-world location may include one or more of a theme park, an amusement park, a cruise ship, a shopping mall, sporting venue, concert venue, and/or other locations. The users may participate in the interactive environment by having passive and/or active experiences within the interactive environment. Accordingly, in some implementations, the term "interactive" in "interactive environment" may not be used to impliedly require the user to actively interact with and/or in the environment.

In some implementations, the user experiences may include one or more of visiting an attraction (e.g., a ride and/or other attraction), interacting with an attraction, (e.g., riding the ride and/or other interactions), interacting with other users, attending live shows (e.g., a concert), playing games, witnessing an event, and/or other forms of participation. In some implementations, witnessing an event may be a form of passive participation. By way of non-limiting illustration, for a sporting venue, an event may include an athletic achievement by a team and/or player (e.g., hitting a homerun in baseball).

One or more implementations of system 100 may provide users with physical items through one or more special purpose physical item dispensers. The physical items may be specifically selected and dispensed to the users based on the experiences that have occurred during their past participation. In some implementations, the physical items may complement the past experiences. For example, the physical items may provide further entertainment value complimentary to the experiences. In some implementations, the physical items may facilitate completion of future experiences that may be related to past experiences. For example, physical items may provide guidance in completing one or more future experiences. The guidance may be in the form of one or more of a clue, a hint, a code, and/or other guidance.

In some implementations, a physical item dispenser may be a special purpose device configured to store and/or dispense the physical items. A physical item dispenser may physically resemble one or more themes. The theme may be related to one or more of a location, a brand, a franchise, an experience and/or set of experiences, and/or other themes. By way of non-limiting illustration, multiple physical item dispensers may be positioned throughout a location. Individual physical item dispensers may be positioned at or near individual attractions.

In FIG. 1, system 100 may include one or more of one or more physical processors 104, one or more physical item dispensers 120, one or more readers 122, one or more physical tokens 124, external resource(s) 126, and/or other components.

An individual physical token of one or more physical tokens 124 may be a standalone physical object. Individual tokens may be associated with individual users. Individual tokens may be held by, worn, and/or otherwise associated with individual users. Individual tokens may be used to identify individual users (see, e.g., user component 110).

An individual reader of one or more readers 122 may be configured to obtain signals from individual tokens. A given signal may convey information associated with the given token (information stored by the given token), and/or other information. In some implementations, an individual reader may be configured to communicate information to individual tokens via signals conveying the information (e.g., write information back to a given token). An individual reader may include one or more radio-frequency communication components. The one or more radio-frequency communication components may include one or more radio-frequency identification (RFID) components. By way of non-limiting illustration, an individual reader may comprise an RFID reader and/or writer. In some implementations, communication of signals to and/or from an individual reader and an individual token may require the token to come into proximity of the individual reader. The distances required for communication may be dependent on the configuration and/or capabilities of the respective RFID components. In some implementations, the distance required for communication may predetermined (e.g., within one meter and/or other distances). In some implementations, communication of signals to and/or from an individual reader and an individual token may require physical contact of the individual token with the individual reader.

In some implementations, individual readers of one or more readers 122 may be operatively coupled to individual physical item dispensers of one or more physical item dispensers 120. In some implementations, an individual reader may be a peripheral device configured to be communicatively coupled with an individual physical item dispenser, for example, via network(s) 118. The network(s) 118 may include one or more of the Internet, Wi-fi, wired connections, and/or other communication networks. The reader may be physically separate from the physical item dispenser. In some implementations, an individual reader may be physically integrated with a physical item dispenser so as to form a singular device with the physical item dispenser. According to some implementations, one or more physical processor 104 may be communicatively coupled with one or more readers 122, for example, via network(s) 118.

In some implementations, the individual physical token may depict and/or may have a form factor that physically embodies an appearance of an entity. The entity may be a virtual entity such as one or more of a game entity, an animated entity, and/or other entities. The entity may be a fantastical entity, such as a fictional character in a movie portrayed by a real person. Examples of form factors may include one or more of a toy figurine, a toy accessory, article of clothing, and/or other form factors. By way of non-limiting example, a physical token may be one or more of a toy figurine embodying an appearance of a fictional character in a movie, a toy accessory embodying an appearance of a virtual tool or object, and/or other types of physical tokens. A physical token may be an RFID enabled device including one or more of one or more radio frequency communication components, non-transitory electronic storage, and/or other components. The one or more radio frequency communication components may be configured to facilitate communication with one or more readers 122. The non-transitory electronic storage may be configured to store information associated with the individual token.

In some implementations, a physical token may include an object that may be used in gameplay. By way of non-limiting illustration, a physical token may be configured to interface with gaming consoles and/or computing platforms. In some implementations, a physical token may depict a game entity (e.g., game character) in a game.

In some implementations, a physical token may include a device worn and/or held by a user. The physical token may include one or more of a wristband, a tag, a card, a coin, and/or other objects. By way of non-limiting illustration, the object may be an RFID enabled device including one or more of one or more radio frequency communication components, non-transitory electronic storage, and/or other components. The non-transitory electronic storage may be configured to store one or more of user identification information, usage information, and/or other information.

In some implementations, an individual token may include a computing platform associated with a user. By way of non-limiting illustration, a computing platform may include a mobile computing platform. The mobile computing platform may include one or more of a smartphone, a tablet computer, a smart watch, and/or other computing platforms. The computing platform may include RFID components and/or other components that enable the computing platform to function as a physical token as described herein.

In some implementations, detection of a physical token by a reader may be facilitated by electronics embedded within or otherwise included in the physical token. For example, the physical token may include a radio-frequency identification (RFID) chip configured to emit and/or receive radio-frequency electromagnetic signals responsive to the physical token being disposed in a proximity of an individual reader of one or more readers 122. The physical token may include an integrated circuit configured to transfer signals responsive to the physical token being placed in contact with a portion of an individual reader and/or within a proximity of the individual reader.

In some implementations, a physical token may be configured to store information associated with one or more of identification of a user of the physical token (e.g., user identification information), identification of the physical token itself (e.g., token identification information), and/or other information.

In some implementations, user identification information may include information that identifies individual users associated with the individual tokens. The user identification information may include one or more of a name, a username, a handle, subscription information, and/or other information. The token identification information may include information that identifies individual physical tokens. The token identification information may include one or more of a name, a serial number, and/or other information. The communication of token identification information may further facilitate detection of presence of the physical token storing the token identification information. The token identification information may be unique to an individual physical token. That is, even if two different tokens appear identical, the different physical tokens may have different unique token identification information to distinguish between them.

In FIG. 1, one or more physical processors 104 may be configured to provide information processing capabilities in system 100. The one or more physical processors 104 may be included with and/or coupled to one or more servers (not shown), one or more computing platforms, and/or other devices. By way of non-limiting illustration, the one or more physical processors 104 may be included in server(s) managed by a location hosting the interactive environment.

The one or more physical processors 104 may be configured by machine-readable instructions 106. The machine-readable instructions 106 may include one or more computer program components. Executing the machine-readable instructions 106 may cause one or more physical processors 104 to facilitate providing physical items to users participating in a real-world interactive environment. The computer program components may include one or more of an item management component 108, a user component 110, a detection component 112, a dispensing component 114, and/or other components.

The item management component 108 may be configured to manage item inventory information and/or other information. Managing item inventory information may include effectuating storage of the item inventory information within electronic storage 116, retrieving the information from storage, and/or other operations. The item inventory information may include information about physical items available for distribution to users from individual ones of one or more physical item dispensers 120. The item inventory information may include one or more of item description information, item relevance information, and/or other information.

The item description information may include descriptions of physical items, and/or other information. The descriptions may include one or more of names, serial numbers, physical descriptions, and/or other information that uniquely describes individual physical items.

The item relevance information may specify relevance of the individual physical items to the experiences of the individual users within the interactive environment. The relevance of the individual physical items to the experiences may include one or more of a connection of the individual physical items to the experiences, a usability of the individual physical items with the experiences, a usability of the individual physical items with future experiences related to the experiences, and/or other considerations of relevance.

In some implementations, an individual physical item may be connected to an experience by virtue of the individual physical item embodying a physical characteristic (e.g., appearance, sound, smell, taste, or tactile feel) of an aspect of the experience. A physical item may have a connection to the experience by virtue of one or more of the physical items embodying an appearance of a character (e.g., a toy figurine of the character), the physical item embodying an appearance of the fictional location (e.g., a toy resembling the fictional location), and/or other connections.

In some implementations, an individual physical item may be usable with a given experience by virtue of the individual physical item being part of the experience. By way of non-limiting illustration, an experience may include a game played within an interactive environment. A physical item may be usable with the game by virtue of the physical item being the prize for finishing the game.

In some implementations, an individual physical item may be usable with a future experience by virtue of the individual physical item facilitating the completion of one or more future experiences. In some implementations, experiences may be related to future experiences. Following the above game example, "future experiences" may refer to game objectives and/or tasks associated with the game. The physical items may be configured to provide guidance to a user for completion of the objectives and/or tasks. The game may be a scavenger hunt and/or other games. A physical item may be configured to provide guidance in the game. The guidance may be in the form of one or more of a clue, a hint, a code, a cheat, and/or other guidance that may facilitate progress in the scavenger hunt and/or other games. Facilitating progress may refer to moving forward to a next step in the scavenger hunt and/or other games, where the "next step" is a "future experience."

The user component 110 may be configured to access and/or manage user information associated with users of system 100. The user information may include information stored by one or more physical processors 104 (e.g., via electronic storage 116), and/or other storage locations. The user information may include, for example, user profile. The user information may include information identifying users (e.g., a username or handle, a number, an identifier, and/or other identifying information) within the virtual space, security login information (e.g., a login code or password), information identifying physical tokens associated with the individual users (e.g., token identification information), account information, subscription information, relationship information (e.g., information related to relationships between users of the interactive environment), information stated by users, purchase information of users, user experience information, and/or other information related to users.

In some implementations, user experience information for the individual users may describe experiences of the individual users within the interactive environment. The experiences may have occurred during past user participation in the interactive environment. The experiences that have occurred during past participation may be related to future experiences (e.g., experiences not yet carried out). The past experiences and future experiences may be related. By way of non-limiting illustration, the experiences and future experience may be related by one or more of a common theme, common objective/goal/task, and/or other relationships.

In some implementations, user experience information may be defined on an ongoing basis. By way of non-limiting illustration, one or more tokens held by a user may be used record a user's experiences in a location. In some implementations, readers the same as or similar to one or more readers 122 may be positioned throughout the location to allow a user to record their experiences. By way of non-limiting illustration, a reader may be positioned at the end of a ride. As the user exits the ride, the reader may read a token held by a user, and provide information to user component 110 conveying the completion of the experience of the ride. In some implementations, the user experience information may be written to the individual tokens and/or stored by server(s) managed by the location hosting the experiences.

In some implementations, user experience information may be defined by users. By way of non-limiting illustration, users may provide input to define user experience information. By way of non-limiting illustration, a kiosk, computing platform, and/or other computing devices may allow a user to input information describing their experiences as they complete them. By way of non-limiting illustration, an application on a smartphone may allow a user to keep track of their experiences within an interactive environment.

The detection component 112 may be configured to detect presence of physical tokens at or near an individual reader based on signals received from the individual reader. The signals may convey information associated with the tokens. For example, the information associated with the tokens may include information identifying the tokens (e.g., token identification information), information identifying users of the tokens (e.g., user identification information), and/or other information. The presence of the physical tokens at or near an individual reader may convey presence of the physical token and/or the user of the physical token at or near an individual physical item dispenser associated with the individual reader.

The detection component 112 may be configured to identify individual users associated with the detected individual tokens. Identifying users may be based on one or more of information conveyed by the individual tokens (e.g., user identification information, token identification information, and/or other information), information stored by user component 110, and/or other information. By way of non-limiting illustration, based on receiving information identifying the individual tokens, the user component 110 may be queried to match the identified tokens to individual user profiles based on the user profiles including token identification information.

The dispensing component 114 may be configured to, responsive to identifying individual users, obtain user experience information for the identified individual users. The user experience information may be obtained from user component 110, individual tokens via individual readers, and/or other sources. By way of non-limiting illustration, dispensing component 114 may be configured to obtain first user experience information for a first user. The first user experience information may describe a first set of experiences of the first user.

The dispensing component 114 may be configured to identify, based on user experience information, item inventory information, and/or other information, one or more physical items to dispense to the individual users physically present at the individual physical item dispensers. In some implementations, identifying one or more physical items to dispense may comprise one or more of identifying one or more physical items that are relevant to the experiences of the individual users. Identifying physical items that are relevant to an experience may be based on matching the experiences of a user with one or more physical items that have the relatively most relevance to those experiences. By way of non-limiting illustration, dispensing component 114 may access item relevance information and user experience information to match one or more physical items with user experiences based on relevance. By way of non-limiting illustration, if the past experiences include a completion of a themed ride, a relevant physical item may include a toy of the same theme. By way of non-limiting illustration, if the past experiences include completion of a subset of objectives of a game, a relevant physical item may be an item that provides guidance in completing one or more other objectives of the game. By way of non-limiting illustration, if the past experiences include completion of a game, a relevant physical item may be an item that is a reward for the completion of the game.

In some implementations, one or more physical items may be selected for dispensing regardless of relevance and/or relatedness to the experiences of the individual users. For example, physical items to be dispensed to users at a location may be selected by an administrator of system 100 which may or may not take into account specific relevance and/or relatedness of the physical items to the user's experiences at the location. Such items may include, for example, promotional items, food, beverages, and/or other items. By way of non-limiting illustration, attendees at a sporting event, upon witnessing a homerun record or three-point shot record, may qualify for a physical item such as a bobble head, because they witnessed that event. In some implementations, the attendees may get a free soda for witnessing, passively, the same event. Accordingly, the relevance (or lack thereof) of the physical items to be dispensed to the user experiences may be within the scope of control by an administrator of system 100.

The dispensing component 114 may be configured to control individual physical item dispensers of one or more physical item dispensers 120 to dispense identified physical item(s) to individual users. Dispensing physical items may be one or more of automatic in response to detecting presence of a token of a user within a proximity of a physical item dispenser, in response to user input at the physical item dispenser, and/or other considerations. In some implementations, the user input may include input confirming identify of the user, and/or other information.

Figure 3:
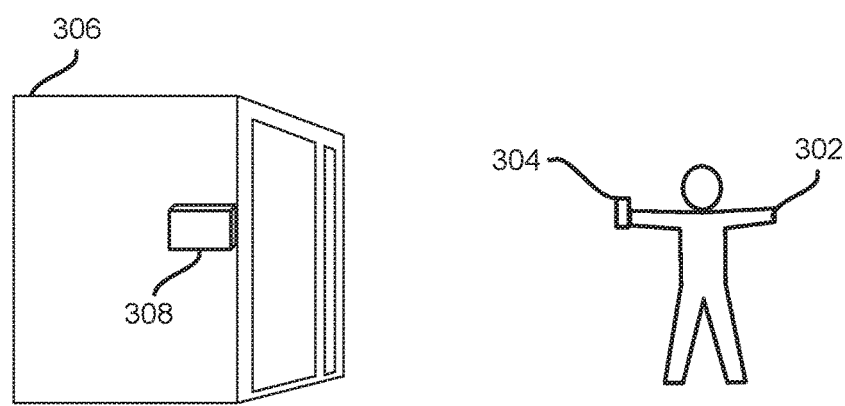
FIG. 3 illustrates a graphic of a user and a physical item dispenser.

FIG. 3 illustrates a graphic of a user 302 and a physical item dispenser 306. The user 302 may be associated with a physical token 304. The physical token 304 may be detectable by a reader 308 operatively coupled with physical item dispenser 306.

Returning to FIG. 1, although one or more physical processors 104, one or more readers 122, one or more physical item dispensers 120, and/or external resource(s) 126 are shown to be connected to network(s) 118 in FIG. 1, other communication mediums may be used to facilitate interaction between any components of system 100. One or more components of system 100 may communicate through hard-wired communication, wireless communication, or both. For example, one or more physical processors 104 may wirelessly communicate with one or more vehicle sensors 124 and/or one or more docks 126. Wireless communication may include one or more of radio communication, Bluetooth communication, Wi-Fi communication, cellular communication, infrared communication, and/or other wireless communication.

Although one or more physical processors 104 is/are shown in FIG. 1 as a single entity, this is for illustrative purposes only. In some implementations, one or more physical processors 104 may comprise a plurality of processing units. These processing units may be physically located within the same device, or one or more physical processors 104 may represent processing functionality of a plurality of devices operating in coordination.

One or more physical processors 104 may be configured to execute one or more of components 108, 110, 112, 114, and/or other components by software; hardware; firmware; some combination of software, hardware, and/or firmware; and/or other mechanisms for configuring processing capabilities on one or more physical processors 104. Although components 108, 110, 112, and/or 114 are illustrated in FIG. 1 as being co-located within a single processing unit, in implementations in which one or more physical processors 104 comprises multiple processing units, one or more of 108, 110, 112, and/or 114 may be located remotely from the other computer program components. The description of the functionality provided by the different computer program components 108, 110, 112, and/or 114 is for illustrative purposes, and is not intended to be limiting, as any of computer program components 108, 110, 112, and/or 114 may provide more or less functionality than is described. For example, one or more of computer program components 108, 110, 112, and/or 114 may be eliminated, and some or all of its functionality may be provided by other computer program components 108, 110, 112, and/or 114. As another example, one or more physical processors 104 may be configured to execute one or more additional computer program components that may perform some or all of the functionality attributed to one or more of computer program components 108, 110, 112, and/or 114.

The electronic storage 116 of one or more physical processors 104 may include electronic storage media that electronically stores information. The electronic storage 116 may store software algorithms, information determined by one or more physical processors 104, information received from other components of system 100, and/or other information that enables system 100 to function properly.

The electronic storage media of electronic storage 116 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 116 may be a separate component within system 100, or electronic storage 116 may be provided integrally with one or more other components of system 100 (e.g., one or more physical processors 104). Although electronic storage 116 is shown in FIG. 1 as a single entity, this is for illustrative purposes only. In some implementations, electronic storage 116 may comprise a plurality of storage units. These storage units may be physically located within the same device, or electronic storage 116 may represent storage functionality of a plurality of devices operating in coordination.

The external resource(s) 126 may include sources of information, hosts (e.g., a host server that serves content), external entities participating with system 100, providers of content, and/or other resources. In some implementations, some or all of the functionality attributed herein to external resource(s) 126 may be provided by resources included in system 100.

Figure 2:
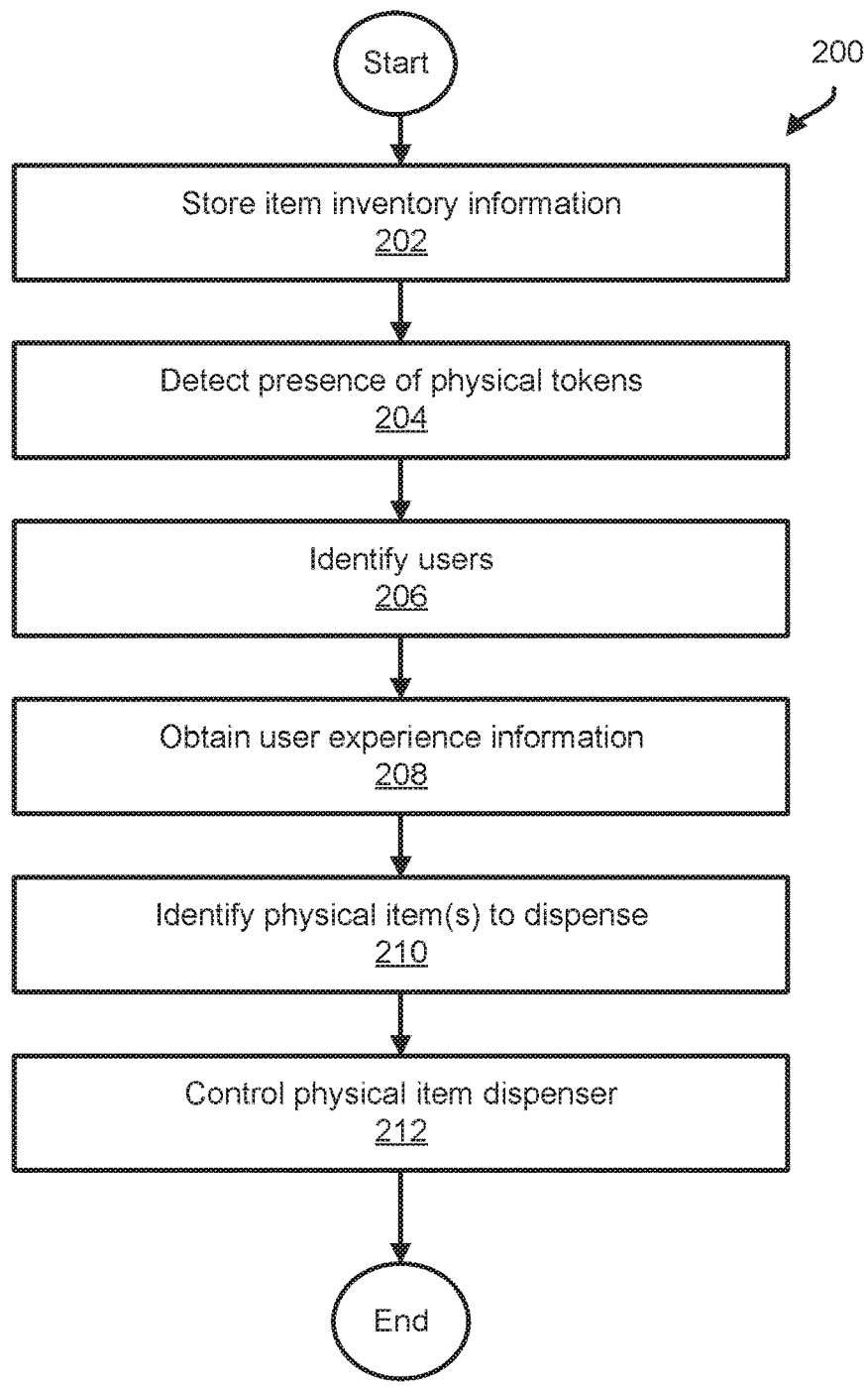
FIG. 2 illustrates a method to provide physical items to users participating in a real-world interactive environment, in accordance with one or more implementations.

FIG. 2 illustrates method 200 to provide physical items to users participating in a real-world interactive environment, in accordance with one or more implementations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in a system the same as or similar to system 100 in FIG. 1. The system may comprise one or more processing devices (e.g., a hardware processor, a digital processor, an analog processor, a digital circuit designed to process information, a central processing unit, a graphics processing unit, a microcontroller, an analog circuit designed to process information, a state machine, and/or other mechanisms for electronically processing information), one or more physical item dispensers, one or more readers, and/or other devices. The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200. The one or more processing devices may be the same as or similar to one or more physical processors 104 in FIG. 1.

Referring to FIG. 2 and method 200, at operation 202, storage of item inventory information may be effectuated. The item inventory information may include descriptions of physical items available for distribution to users from one or more physical item dispensers. In some implementations, operation 202 may be performed by one or more physical processors executing a processor component the same as or similar to item management component 108 (shown in FIG. 1).

At operation 204, presence of physical tokens at or near one or more readers may be detected based on signals received from one or more readers. An individual reader may be communicatively coupled with a physical item dispenser. The individual physical tokens may be standalone physical objects. The physical tokens may include a first token and/or other tokens. The first token may be detectable based on a first signal conveying information associated with the first token being received from an individual reader. In some implementations, operation 204 may be performed by one or more physical processors executing a processor component the same as or similar to detection component 112 (shown in FIG. 1).

At operation 206, individual users associated with the detected individual tokens may be identified. By way of non-limiting illustration, a first user associated with the first token may be identified. In some implementations, operation 206 may be performed by one or more physical processors executing a processor component the same as or similar to detection component 112 (shown in FIG. 1).

At operation 208, user experience information for the identified individual users may be obtained. The user experience information for the individual users may describe experiences of the individual users within the interactive environment. The experiences may have occurred during past user participation in the interactive environment. By way of non-limiting illustration, first user experience information may be obtained for the first user. The first user experience information may describe a first set of experiences of the first user. In some implementations, operation 208 may be performed by one or more physical processors executing a processor component the same as or similar to dispensing component 114 and/or user component 110 (shown in FIG. 1).

At operation 210, one or more physical items to dispense to the individual users physically present at the individual physical item dispensers may be identified based on the user experience information, the item inventory information, and/or other information. By way of non-limiting illustration, a first physical item may be identified from the item inventory information based on the first set of experiences and/or other information. In some implementations, operation 210 may be performed by one or more physical processors executing a processor component the same as or similar to dispensing component 114 (shown in FIG. 1).

At operation 212, the individual physical item dispensers may be controlled to dispense the identified physical item(s). By way of non-limiting illustration, a physical item dispenser may be controlled to dispense the first physical item for the first user. In some implementations, operation 212 may be performed by one or more physical processors executing a processor component the same as or similar to dispensing component 114 (shown in FIG. 1).

Although the system(s) and/or method(s) of this disclosure have been described in detail for the purpose of illustration based on what is currently considered to be the most practical and preferred implementations, such detail is solely for that purpose and that the disclosure is not limited to the disclosed implementations, but, on the contrary, is intended to cover modifications and equivalent arrangements that are within the spirit and scope of the appended claims. The present disclosure contemplates that, to the extent possible, one or more features of any implementation can be combined with one or more features of any other implementation.

What is claimed is:

1. A system configured to provide physical items to users participating in a real-world interactive environment, the system comprising:
   one or more physical processors configured by machine-readable instructions to:
      effectuate storage of item inventory information, the item inventory information including descriptions of physical items available for distribution to users from a physical item dispenser;
      detect presence of physical tokens at or near an individual reader based on signals received from the reader, the reader being communicatively coupled with the physical item dispenser, individual physical tokens being standalone physical objects, the physical tokens including a first token, the first token being detectable based on a first signal conveying information associated with the first token being received from the reader;
      identify individual users associated with the detected individual tokens, such that a first user associated with the first token is identified;
      obtain user experience information for the identified individual users, the user experience information for the individual users describing experiences of the individual users within the interactive environment, the experiences having occurred during past user participation in the interactive environment, such that first user experience information is obtained for the first user, the first user experience information describing a first set of experiences of the first user;
      identify, based on the user experience information and the item inventory information, one or more physical items to dispense to the individual users physically present at the physical item dispenser, such that a first physical item is identified from the item inventory information based on the first set of experiences; and
      control the physical item dispenser to dispense the identified one or more physical items, such that the physical item dispenser is controlled to dispense the first physical item for the first user.

2. The system of claim 1, wherein the item inventory information further specifies relevance of the individual physical items to the experiences of the individual users within the interactive environment.

3. The system of claim 2, wherein identifying, based on the user experience information and the item inventory information, one or more physical items to dispense to the individual users physically present at the physical item dispenser comprises:
   identifying, from the item inventory information, one or more physical items that are relevant to the experiences of the individual users, such that the first physical item is identified for the first user based on the first physical item being relevant to the first set of experiences of the first user.

4. The system of claim 3, wherein the relevance of the individual physical items to the experiences includes one or more of a connection of the individual physical items to the experiences, or usability of the individual physical items with future experiences related to the experiences.

5. The system of claim 4, wherein an individual physical item is connected to an experience by virtue of the individual physical item embodying a physical appearance of an aspect of the experience.

6. The system of claim 4, wherein an individual physical item is usable with a future experience by virtue of the individual physical item facilitating the completion of the future experience.

7. The system of claim 1, wherein an individual token comprises an RFID enabled device.

8. The system of claim 7, wherein the RFID enabled device is one or more of a toy, a wristband, or a mobile computing platform.

9. The system of claim 1, wherein the one or more physical processors are further configured by the machine-readable instructions to:

obtain user identification information for the individual users, the user identification information for the individual users including information identifying the individual user and information associated with the individual tokens associated with the individual users; and wherein identifying the individual users associated with the detected individual tokens is based on the user identification information.

10. The system of claim 1, wherein the experiences of the individual users within the interactive environment include passive and active experiences.

11. A method to provide physical items to users participating in a real-world interactive environment, the method being implemented in a computer system comprising one or more physical processors and storage media storing non-transitory electronic storage, the method comprising:

accessing item inventory information, the item inventory information including descriptions of physical items available for distribution to users from a physical item dispenser;

detecting presence of physical tokens at or near an individual reader based on signals received from the reader, the reader being communicatively coupled with the physical item dispenser, individual physical tokens being standalone physical objects, the physical tokens including a first token, the first token being detectable based on a first signal conveying information associated with the first token being received from the reader;

identifying individual users associated with the detected individual tokens, such that a first user associated with the first token is identified;

obtaining user experience information for the identified individual users, the user experience information for the individual users describing experiences of the individual users within the interactive environment, the experiences having occurred during past user participation in the interactive environment, including obtaining first user experience information for the first user, the first user experience information describing a first set of experiences of the first user;

identifying, based on the user experience information and the item inventory information, one or more physical items to dispense to the individual users physically present at the physical item dispenser, including identifying a first physical item from the item inventory information based on the first set of experiences; and controlling the physical item dispenser to dispense the identified one or more physical items, including controlling the physical item dispenser to dispense the first physical item for the first user.

12. The method of claim 11, wherein the item inventory information further specifies relevance of the individual physical items to the experiences of the individual users within the interactive environment.

13. The method of claim 12, wherein identifying the one or more physical items to dispense to the individual users physically present at the physical item dispenser comprises:

identifying, from the item inventory information, one or more physical items that are relevant to the experiences of the individual users, such that the first physical item is identified for the first user based on the first physical item being relevant to the first set of experiences of the first user.

14. The method of claim 13, wherein the relevance of the individual physical items to the experiences includes one or more of a connection of the individual physical items to the experiences, or usability of the individual physical items with future experiences related to the experiences.

15. The method of claim 14, wherein an individual physical item is connected to an experience by virtue of the individual physical item embodying a physical appearance of an aspect of the experience.

16. The method of claim 4, wherein an individual physical item is usable with a future experience by virtue of the individual physical item facilitating the completion of the future experience.

17. The method of claim 11, wherein an individual token comprises an RFID enabled device.

18. The method of claim 17, wherein the RFID enabled device is one or more of a toy, a wristband, or a mobile computing platform.

19. The method of claim 11, further compromising:

obtaining user identification information for the individual users, the user identification information for the individual users including information identifying the individual user and information associated with the individual tokens associated with the individual users; and wherein identifying the individual users associated with the detected individual tokens is based on the user identification information.

20. The method of claim 11, wherein the experiences of the individual users within the interactive environment include passive and active experiences.

* * * * *